United States Patent [19]

Takeuchi et al.

[11] Patent Number: 5,077,531
[45] Date of Patent: Dec. 31, 1991

[54] PSK SIGNAL DEMODULATION SYSTEM

[75] Inventors: Yoshio Takeuchi; Teruhiko Honda, both of Tokyo, Japan

[73] Assignee: Kokusai Denshin Denwa Co., Ltd., Tokyo, Japan

[21] Appl. No.: 629,749

[22] Filed: Dec. 18, 1990

[30] Foreign Application Priority Data

Dec. 19, 1989 [JP] Japan .................................. 1-327375

[51] Int. Cl.$^5$ .............................................. H03D 3/00
[52] U.S. Cl. .................................... 329/304; 329/307; 375/83
[58] Field of Search ........................ 329/304, 306, 307; 375/52, 53, 55-58, 83-87

[56] References Cited

U.S. PATENT DOCUMENTS 4,912,422 3/1990 Kobayashi et al. .................. 329/306

OTHER PUBLICATIONS

"A Method of High Precision Frequency Detection with FFT", Makoto Tabei et al., vol. J 70-A, No. 5, pp. 798-805, May 1987.
"A Calculative Demodulation Method for PSK Signals in Burst Mode", Teruhiko Honda et al., pp. 57-64, Oct. 30, 1987.
"A Demodulation Method by Stored Signal Processing for PSK Burst Signal (I)", Teruhiko Honda et al., pp. 7-12, Sep. 29, 1988.
"A Demodulation Method by Stored Signal Processisng for PSK Burst Signal (II)", Yoshio Takeuchi et al., pp. 13-18, Sep. 29, 1988.

Primary Examiner—Robert J. Pascal
Attorney, Agent, or Firm—Armstrong, Nikaido, Marmelstein, Kubovcik & Murray

[57] ABSTRACT

A PSK signal which is subject to frequency fluctuation and noise is demodulated through a quasi-coherent detection process with a fixed local frequency oscillator (5) noise elimination process using a low pass filter (17,18) after frequency adjustment, and a frequency and phase regeneration process using a PLL circuit (20). The PLL circuit (20) is updated by the estimated center frequency of a received signal by using an FFT (fast Fourier transform) circuit (11), a power spectrum means (12,13,14), and a frequency estimation circuit (15) estimating the center frequency based upon the fact that the modulated signal component exists only on a high level portion of the frequency spectrum.

13 Claims, 12 Drawing Sheets

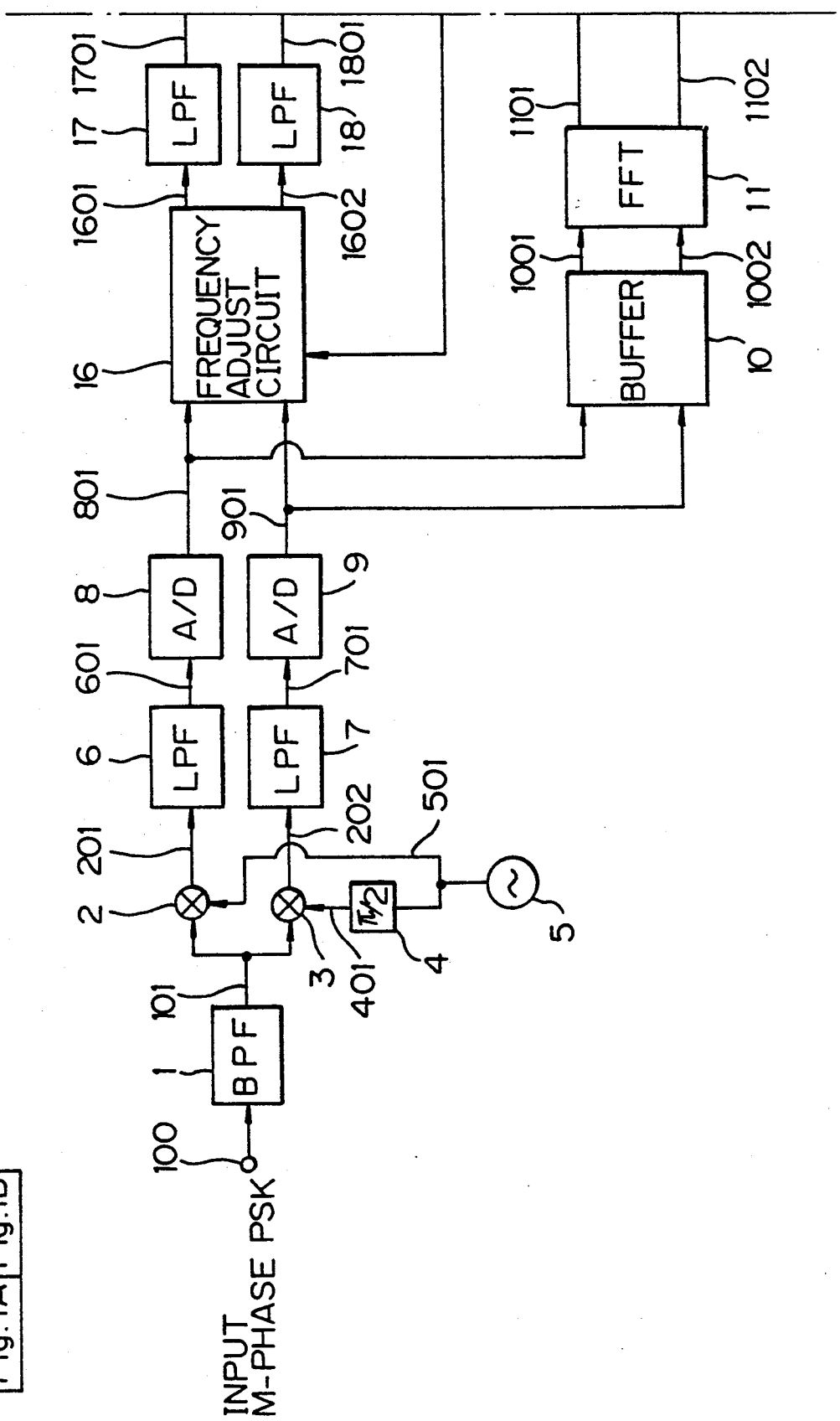

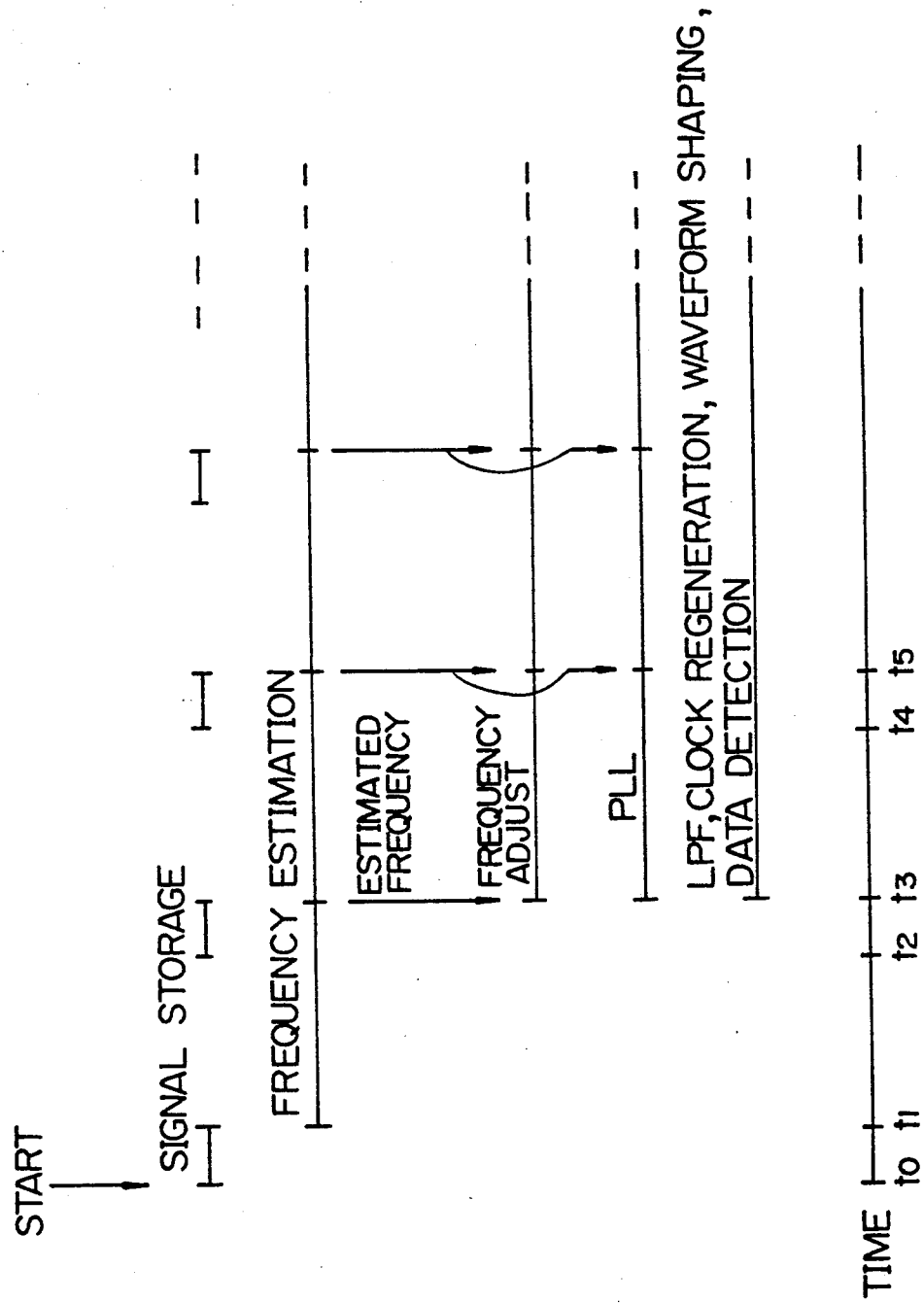

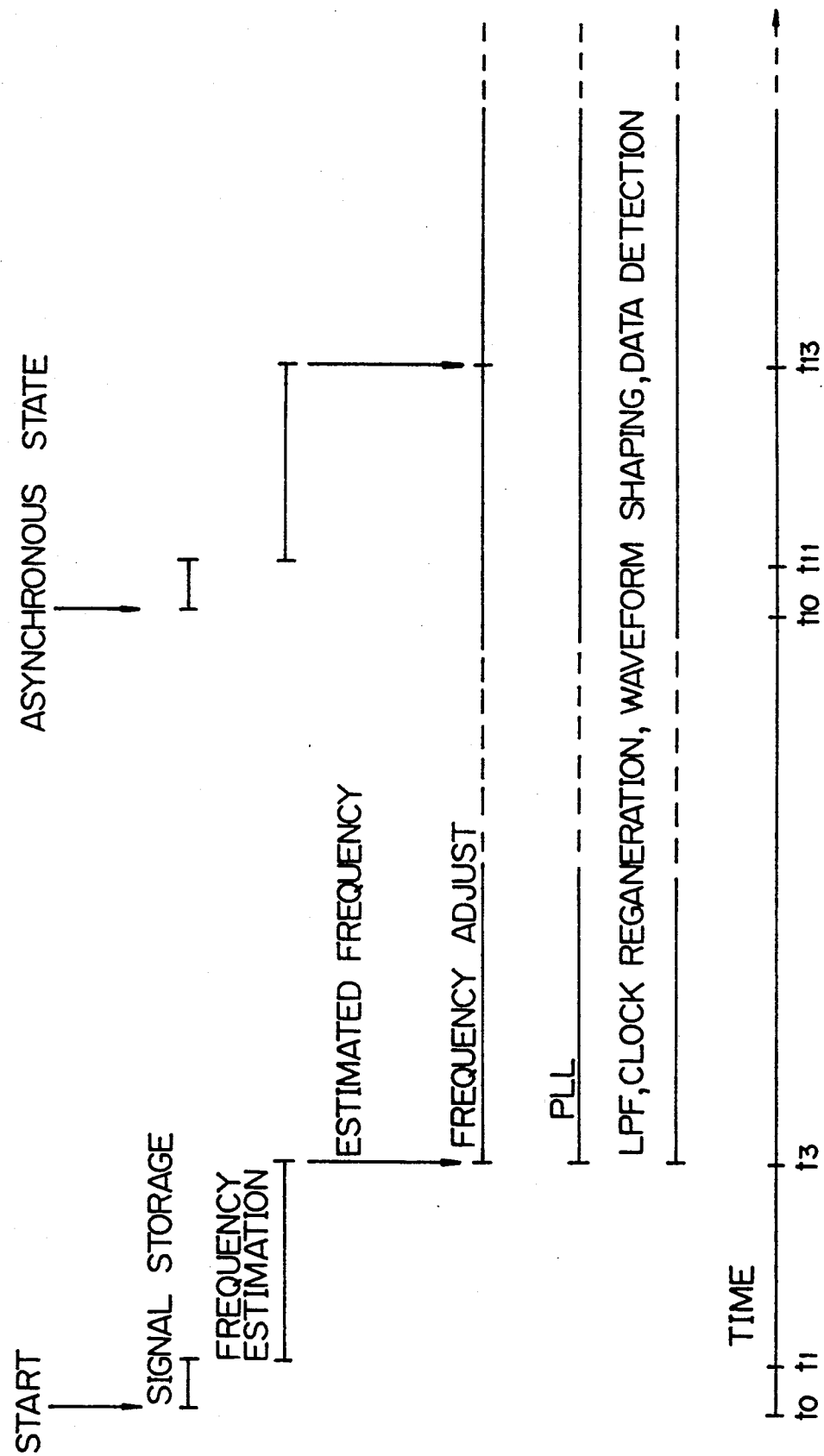

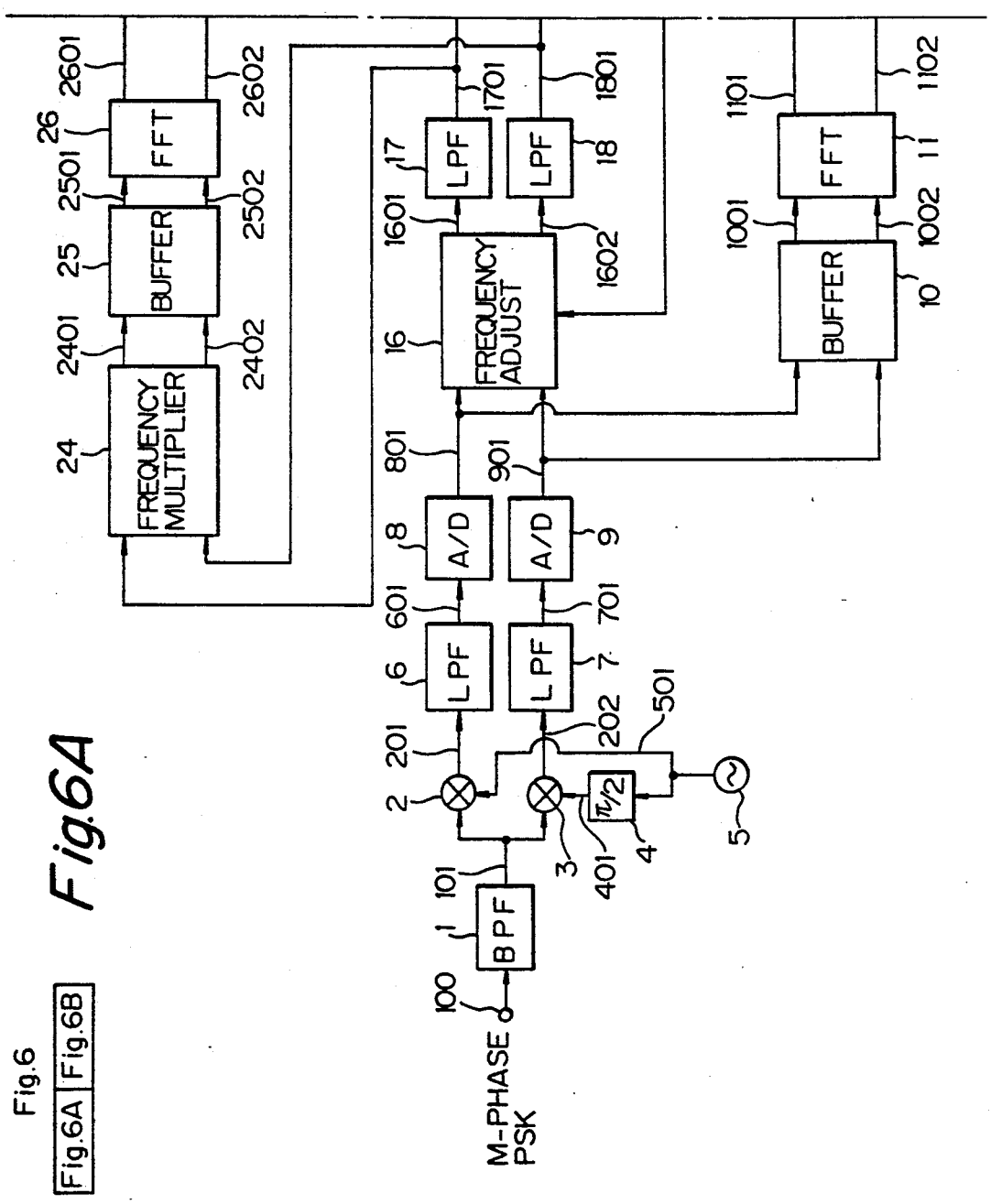

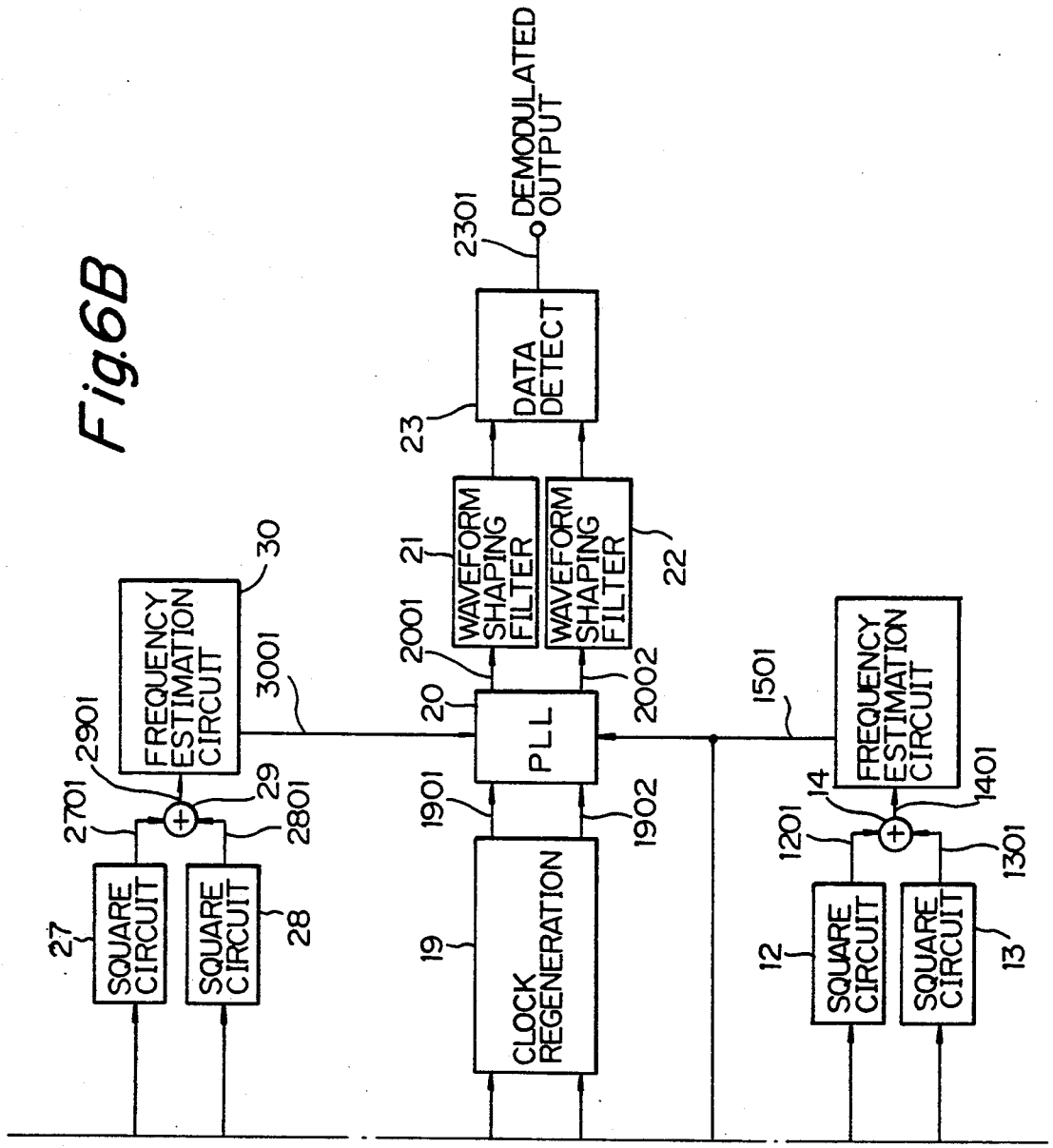

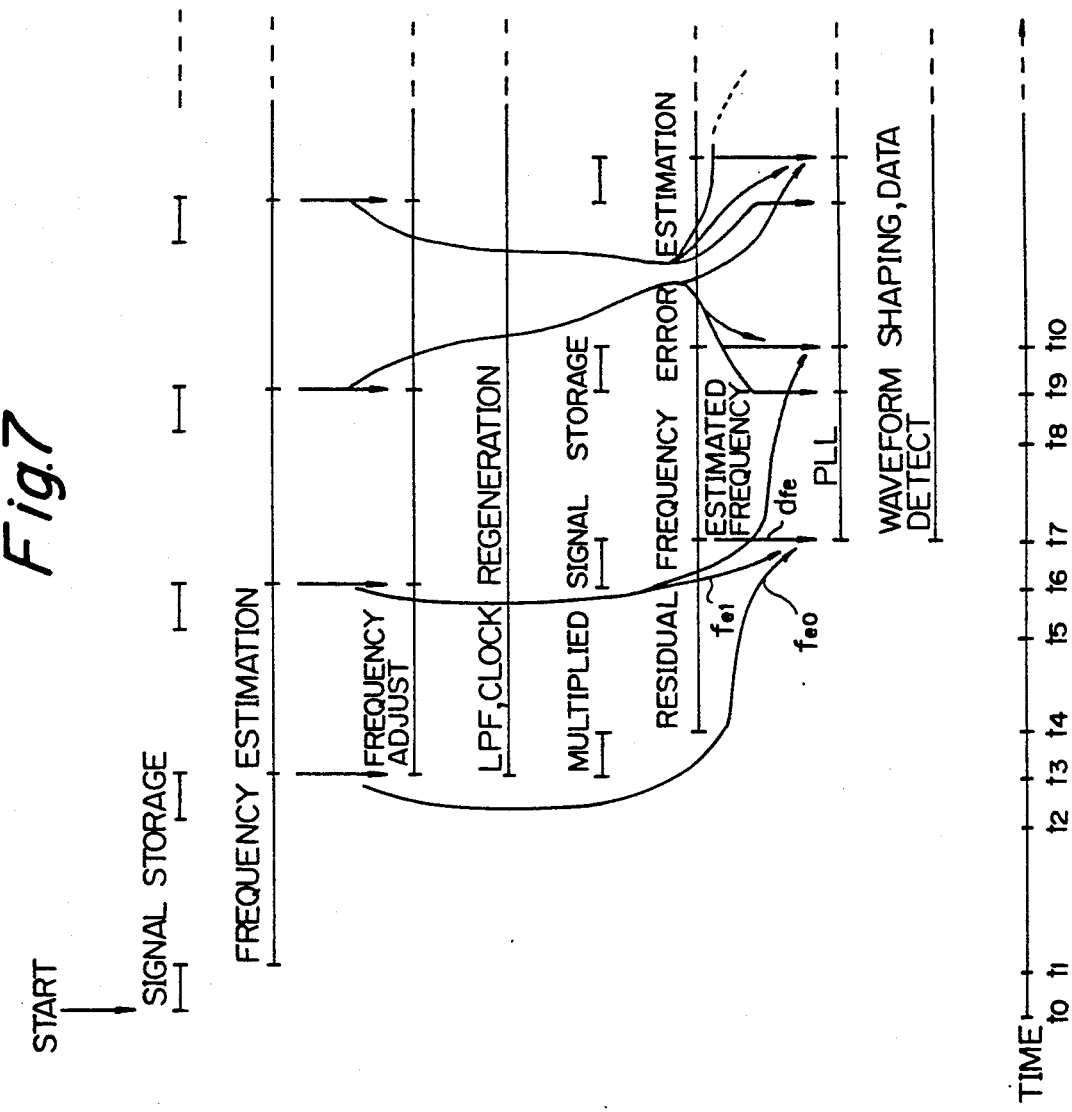

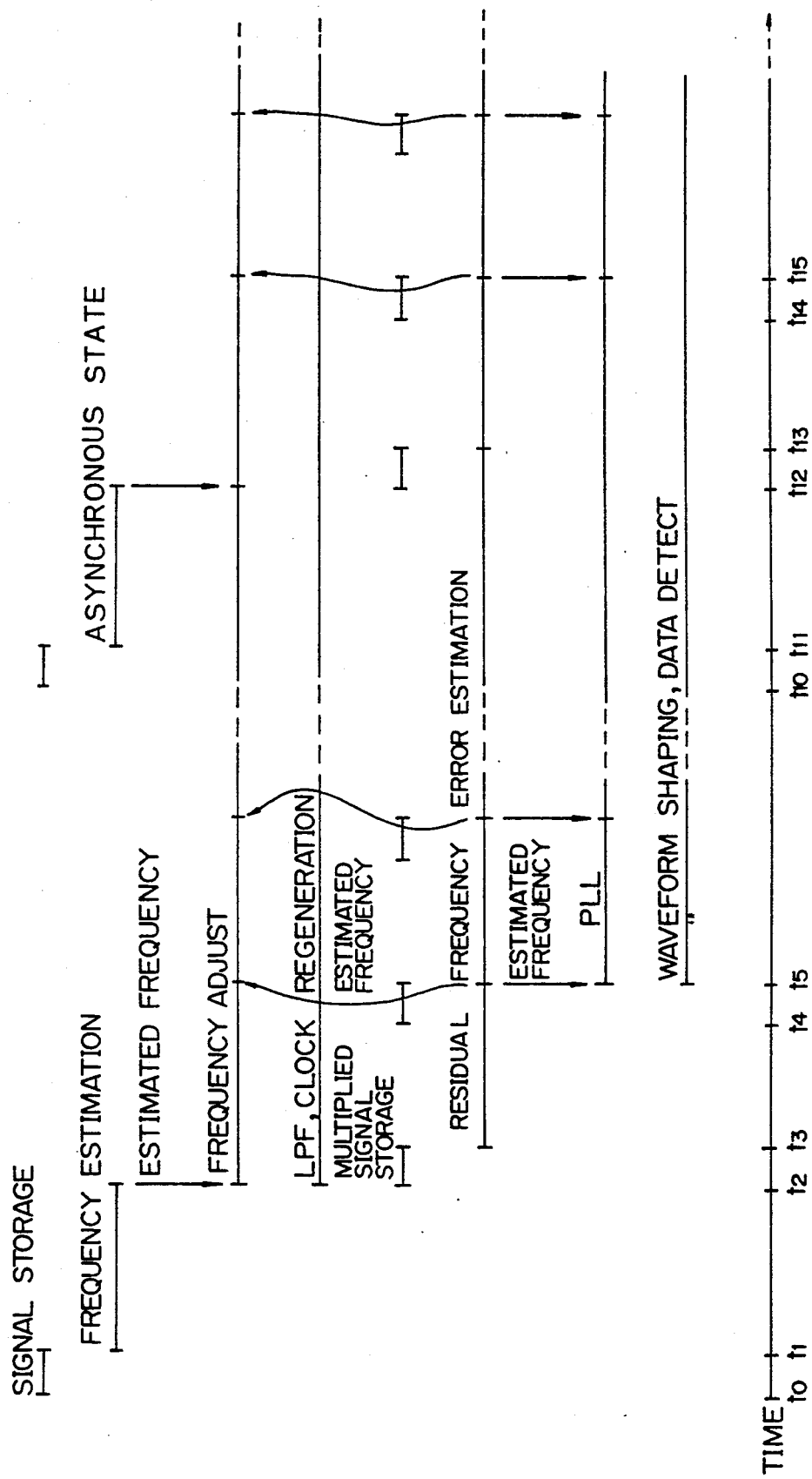

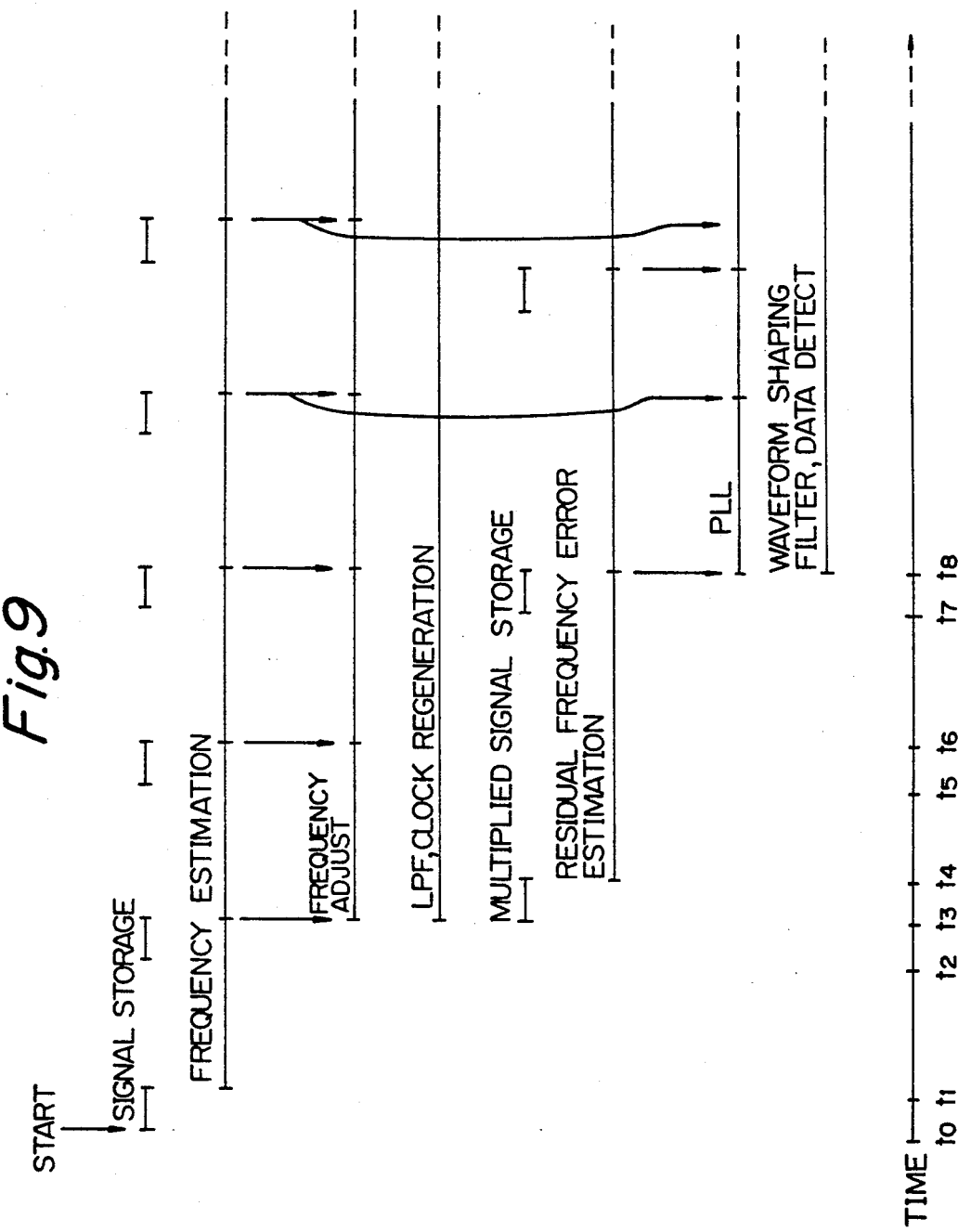

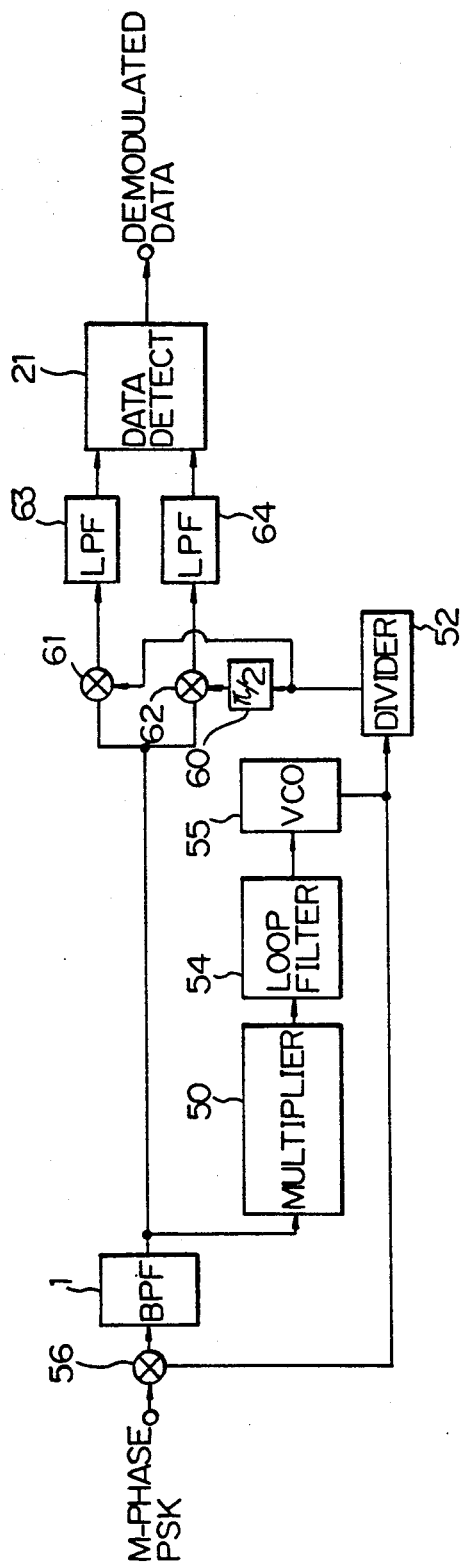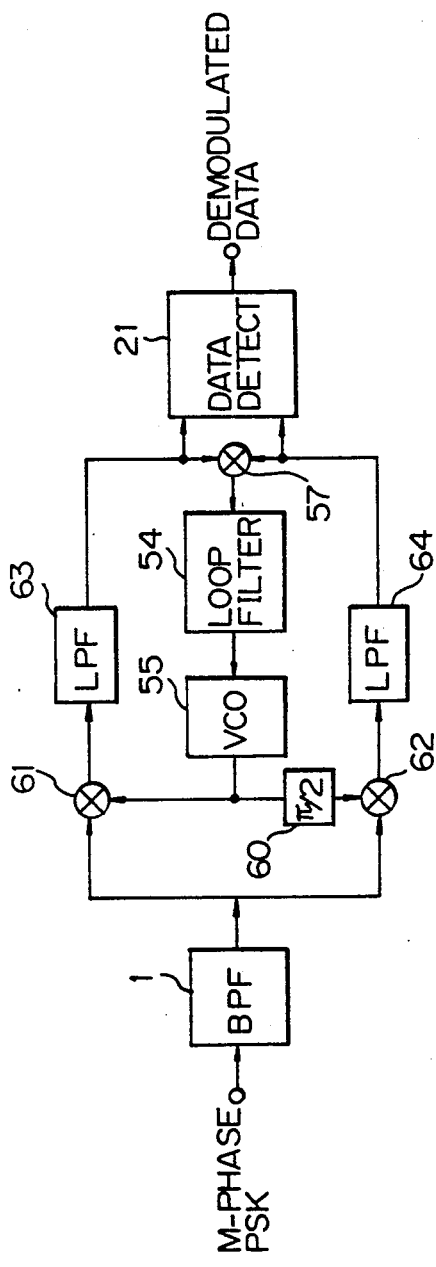

PSK SIGNAL DEMODULATION SYSTEM

BACKGROUND OF THE INVENTION

The present invention relates to a demodulation system for a PSK modulation signal through coherent detection.

Conventionally, a PSK demodulation system must regenerate the reference carrier signal for the purpose of coherent detection.

A reference carrier signal regeneration is carried out by using a narrow band filter or a PLL (phase lock loop) for a multiplied signal of a modulation signal, or by using a costas PLL. When a PLL or a costas PLL is used, a filter is used in a loop for removing phase variation by noise.

FIG. 10 shows a prior art system which uses a frequency multiplier and a narrow band filter. A received signal which is an M-phase PSK signal (M is an integer larger than 2) is applied to the bandpass filter 1. One output of the bandpass filter 1 is applied to the frequency multiplier 50, which provides non-modulated signal having the center frequency M times as high as that of the input signal. The output of the multiplier 50 is applied to the frequency divider 52 which provides the reference carrier signal by dividing the frequency to 1/M through the narrow band filter 51 which reduces noise. A coherent detection is carried out for an input signal by using the $\pi/2$ phase shifter 60, the multiplicators 61 and 62, and the low pass filters 63 and 64 by using the regenerated carrier signal. The data detect circuit 21 carries out the data detection to provide a demodulated output signal.

FIG. 11 shows another prior art system which uses a multiplier and a PLL. The feature of FIG. 11 is the use of the PLL having the multiplicator 53, the loop filter 54 and the VCO (voltage controlled oscillator) 55, instead of the narrow band filter 51 in FIG. 10. In FIG. 11, the PLL generates the synchronized signal with the multiplied non-modulation signal. The frequency divider 52 provides the divided frequency as the regenerated reference carrier signal.

FIG. 12 is also a prior art system, and is the modification of FIG. 11. The feature of FIG. 12 is that the frequency multiplier 50 and the bandpass filter 1 are included in the loop of the PLL.

FIG. 13 is still another prior art system which uses a costas PLL.

We have proposed the U.S. Pat. No. 4,912,422 as one of the carrier regeneration systems. In that system, an input is quasi-coherent detected, and then, converted to frequency domain signal from time domain signal through FFT (fast Fourier transform). In that system, the frequency and the phase of the multiplied non-modulation signal are estimated on the frequency domain, and the received signal is adjusted by using the estimated frequency and phase, instead of the using a PLL. The coherent detection is carried out by using the adjusted frequency and phase.

By the way, in a satellite communication system, the carrier frequency of a received signal is, generally, different from that of the transmit frequency because of the incomplete frequency stability of each of the stations, and/or the frequency conversion in a satellite. In the case of a low speed digital communication system, which has a narrow bandwidth, the offset of the received frequency due to the above reasons is even four or five times as large as that of the bandwidth of the signal. When the signal has such a large frequency offset, the bandpass filter 1 in FIG. 10 or FIG. 11 must have wide bandwidth for accepting the maximum frequency offset, and therefore, when the C/N (carrier to noise) ratio is low, it is impossible to regenerate carrier frequency.

In the case of FIG. 12 or FIG. 13, it is possible to follow a large frequency offset. However, the range of frequency lock is less than the bandwidth of a loop filter. So, if we try the direct frequency lock, the loop bandwidth must be large, and the C/N of the regenerated carrier signal would be degraded. In order to solve the above problem, it has been proposed to sweep the oscillation frequency by a VCO, however, as the lock-in speed depends upon the sweep speed, and the sweep speed depends upon the bandwidth of a loop filter, the high speed frequency lock is impossible when the C/N is low.

The U.S. Pat. No. 4,912,422 intends to handle only TDMA burst signal, and is not suitable to follow the change of frequency and phase of a continuous PSK signal. Further, as the frequency and the phase of a carrier signal are obtained through interpolation to discrete samples, the accuracy of the result is not enough.

SUMMARY OF THE INVENTION

It is an object, therefore, of the present invention to overcome the disadvantages and limitations of a prior demodulation system for a PSK signal by providing a new and improved demodulation system for a PSK signal.

It is also an object of the present invention to provide a demodulation system for a PSK signal applicable to a circuit with a low carrier to noise ratio (C/N) and a large frequency offset in a short time period.

It is also an object of the present invention to provide a PSK demodulation system for a PSK signal, in which it follows the continuous frequency change of a carrier signal in a long time period.

The above and other objects are attained by a PSK signal demodulation system which incorporates an input terminal (100) for accepting a received signal; a bandpass filter (1) having a bandwidth wider than the bandwidth of the received signal, and coupled with the said input terminal (100) for passing the received signal; a local frequency generation means (4,5) having a fixed frequency generator (5) and a phase shifter (4) for providing local frequency with a predetermined phase relation with the output of the fixed frequency generator; a coherent detection means (2,3) coupled with the bandpass filter (1) for coherent detection of the received signal using the local frequency; an analog/digital converter (8,9) for converting the coherent detected signal with a predetermined sampling interval; a storage means (10) for storing temporarily the output of the analog/digital converter; an FFT (fast Fourier transform) conversion means (11) for converting the time domain signal stored in the storage means (10) to a frequency domain signal; a power spectrum means (12,13,14) for providing power spectrum coupled with output of the FFT means (11); a frequency estimation means (15) for estimating the carrier frequency of the received signal using the power spectrum; a frequency adjustment means (16) coupled with the output of the analog/digital converter (8,9) and output of the frequency estimation means (15) for frequency adjustment of the received carrier signal; a low pass filter (17,18) coupled with the output of said frequency adjustment means (16) for decreasing a noise component imposed on the received signal; a clock regeneration means (19) coupled with output of said low pass filter (17,18) for regenerating a clock signal; a PLL circuit (20) coupled with the output of the frequency estimation means (15) which updates the inner state of the PLL circuit (20), and coupled with output of the clock regeneration means (19) for correcting frequency and phase of output of said clock regeneration means (19); a symbol decision means (21,22,23) coupled with the PLL circuit (20) for determining each symbol of the received PSK signal, and an output terminal (2301) coupled with the output of the symbol decision means for providing a demodulated output signal.

In a preferred embodiment, a second frequency estimating means (24,25,26,27,28,29,30) is provided for estimating residual frequency error, and setting the inner state of the PLL circuit.

BRIEF DESCRIPTION OF THE DRAWINGS

The foregoing and other objects, features, and attendant advantages of the present invention will be appreciated as the same become better understood by means of the following description and accompanying drawings wherein;

FIG. 4 shows a time schedule of demodulation operation in FIG. 1, FIG. 5 shows another time schedule, FIG. 6(A-B) is a block diagram of the second embodiment according to the present invention, FIG. 7 shows a time schedule of the demodulation operation in FIG. 6, FIG. 8 shows another time schedule of FIG. 6, FIG. 9 shows a time schedule when the estimation of a carrier frequency is carried out asynchronously with the estimation of a residual frequency error, FIG. 12 is a prior art PSK signal demodulation system using a frequency multiplier and a PLL, and FIG. 13 is a prior art PSK signal demodulation system using a Costas PLL.

DESCRIPTION OF THE PREFERRED EMBODIMENTS

Figure 1B:
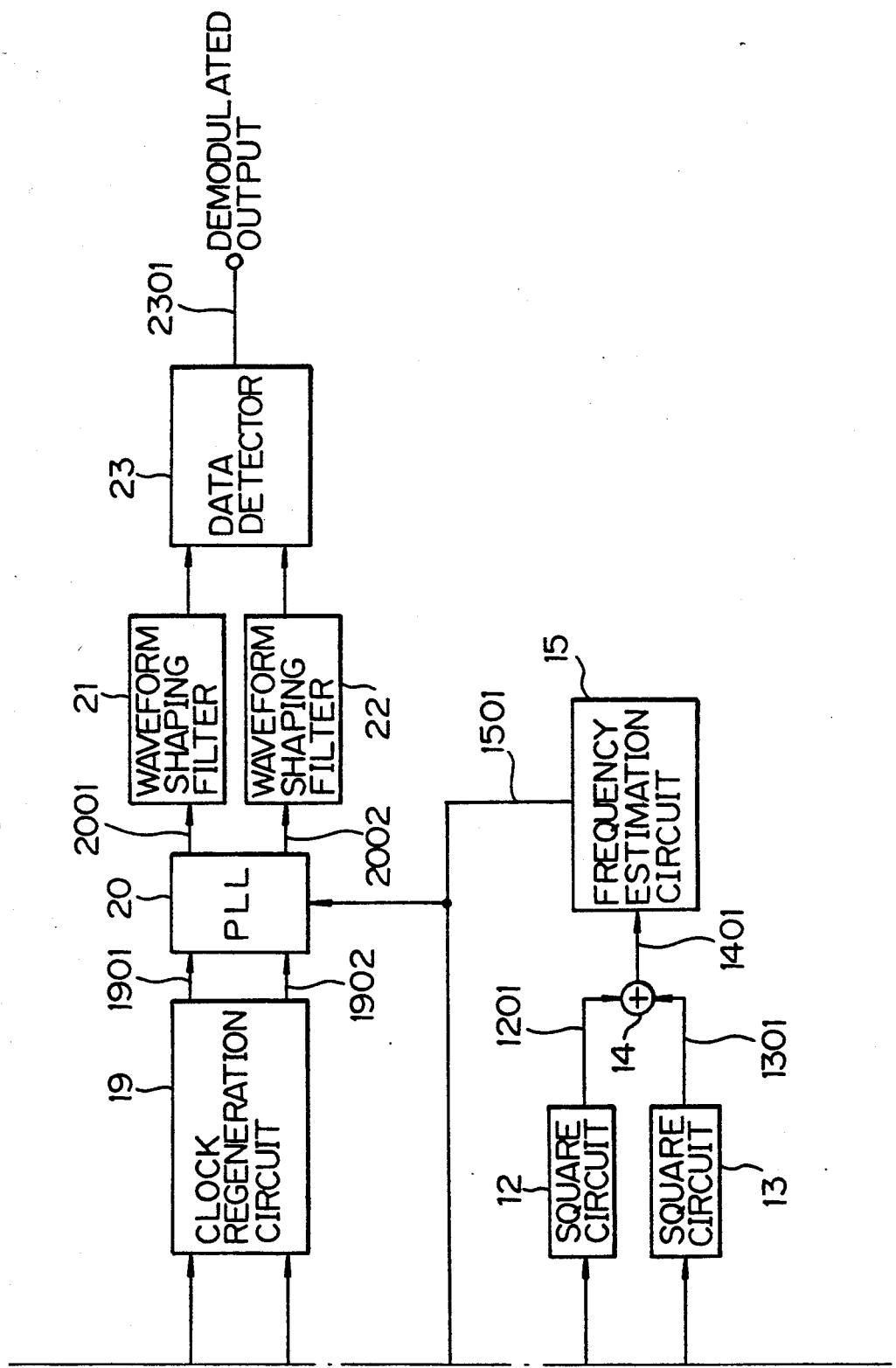
FIG. 1(A-B) is a block diagram of the demodulation system according to the present invention.

FIG. 1 shows a block diagram of a PSK signal demodulation system according to the present invention. In the figure, the numeral 1 is a bandpass filter (BPS), 2 and 3 are a multiplicator, 4 is a $\pi/2$ phase shifter, 5 is a local oscillator, 6 and 7 are a lowpass filter (LPF), 8 and 9 are an analog/digital converter (A/D), 10 is a buffer memory, 11 is an FFT (fast Fourier transform) circuit, 12 and 13 are a square circuit, 14 is an adder, 15 is a frequency estimation circuit, 16 is a frequency adjust circuit, 17 and 18 are a lowpass filter, 19 is a clock regeneration circuit, 20 is a PLL (phase lock loop) circuit, 21 and 22 are a lowpass filter, and 23 is a data detection circuit.

An input signal 100 applied to the bandpass filter 1 is an M-phase PSK signal expressed as follows.

$$S_k(t) = \sqrt{2} \cdot A \cos(\omega_c' t + \theta_k + \theta_0) + n(t) \quad (1)$$
$$(k-1)T \leq t \leq kT$$

In the equation (1), A is the amplitude of a receive signal, $\omega_c'$ angular frequency of carrier signal, $\theta_0$ is the initial phase, and $\theta_k$ is the phase information relating to k'th information bit, and takes $2\pi i/M$ (i is an integer, $0 \leq i \leq M-1$). T is time duration for each symbol, and n(t) is noise superposed on a signal on a transmission circuit.

The angular frequency $\omega_c'$ of a received signal in the equation (1) differs from the angular frequency $\omega_c$ in the transmit side, because of the stability of the transmit frequency and/or the frequency conversion in the transmit circuit. In other words, the circuit has the frequency deviation of $(\omega_c' - \omega_c)$. Therefore, the bandwidth of the bandpass filter 1 must consider the maximum frequency deviation in the transmission circuit.

For instance, when the frequency deviation is equal to the signal bandwidth, the bandwidth of the bandpass filter 1 must be three times as wide as that of the signal bandwidth. Thus, when the frequency deviation of a received signal is large, the bandwidth of the bandpass filter must be wide, and therefore, much of the noise which passes the bandpass filter is applied to the demodulator. The signal and the noise which pass through the bandpass filter 1 are quasi-coherently detected by using the reference frequency obtained in the fixed local oscillator 5. The reference frequency obtained by the fixed local oscillator 5 is expressed as follows:

$$R_c(t) = \sqrt{2} \cos(\omega_c'' t + \theta_1) \quad (2)$$

The $\omega_c''$ in the equation (2) is the angular frequency of the fixed oscillator 5, and is close to the angular frequency $\omega_c$ of the transmit side. It is assumed $\omega_c'' = \omega_c$ in the following description. $\theta_1$ is the initial phase of the fixed oscillator. The reference signal of the equation (2) is modified as follows in passing through the $\pi/2$ phase shifter 4.

$$R_s(t) = \sqrt{2} \sin(\omega_c t + \theta_1) \quad (3)$$

The receive signal of the equation (1) and the reference signals of the equations (2) and (3) are applied to the multiplicators 2 and 3, which provide the following signals.

$$\begin{aligned} e_1(t) &= S(t) \cdot R_c(t) \\ &= A \cos[(\omega_c' - \omega_c)t + \theta_k + \theta_0 - \theta_1] + \\ &\quad A \cos[(\omega_c' + \omega_c)t + \theta_k + \theta_0 - \theta_1] + \\ &\quad n(t) \cdot R_s(t) \end{aligned} \quad (4)$$

$$\begin{aligned} e_2(t) &= S(t) \cdot R_s(t) \\ &= -A \sin[(\omega_c' - \omega_c)t + \theta_k + \theta_0 - \theta_1] + \\ &\quad A \sin[(\omega_c' + \omega_c)t + \theta_k + \theta_0 - \theta_1] + \\ &\quad n(t) \cdot R_s(t) \end{aligned} \quad (5)$$

The signals of the equations (4) and (5) are applied to the lowpass filters 6 and 7, respectively, so that the high frequency components are removed, and the following signals are obtained.

$$e_1'(t) = A \cos[(\omega_c' - \omega_c)t + \theta_k + \theta_0 - \theta_1] + n_c'(t) \quad (6)$$

$$e_2'(t) = -A \sin[(\omega_c' - \omega_c)t + \theta_k + \theta_0 - \theta_1] + n_s'(t) \quad (7)$$

The $n_c'(t)$ and $n_s'(t)$ in the equations (6) and (7) are orthogonal to each other, and show noise components at output of the lowpass filters 6 and 7. $(\omega_c' - \omega_c)$ is the frequency deviation between the receive signal and the reference signal, and is expressed as $\Delta\omega$ hereinafter.

The signals of the equations (6) and (7) are converted to a digital form in the analog/digital converters 8 and 9 as follows:

$$X_i = e_1'(t_i) = A \cos[\Delta\omega t_i + \theta_k + \theta_0 - \theta_1] + n_c'(t_i) \quad (8)$$

$$Y_i = e_2'(t_i) = -A \sin[(\Delta\omega t_i + \theta_k + \theta_0 - \theta_1] + n_s'(t_i) \quad (9)$$

where $t_i$ is i'th sample time. The sampling interval is determined according to the bandwidth of the bandpass filter 1.

The signals $X_i$ and $Y_i$ are applied to the buffer memory 10. When $N_1$ number of $X_i$ and $N_1$ number of $Y_i$ are stored in the memory 10, the $N_1$ sets of data are applied to the FFT (fast Fourier transform) circuit 11, which converts the time domain signal to the frequency domain signal through complex FFT. The FFT circuit 11 provides the amplitude spectrums 1101 and 1102 with a real part and an imaginary part on the frequency domain. Those outputs 1101 and 1102 are applied to the square circuits 12 and 13, respectively. The signals 1101 and 1102 are squared, and the squares are added in the adder 14 to each other so that the $N_1$ number of power spectrum 1401 is obtained. That power spectrum is applied to the frequency estimation circuit 15. The square circuits 12, 13 and the adder 14 compose a power spectrum circuit.

It should be appreciated that the power spectrum 1401 which includes both the modulation signal and the noise component has a high power level in only the band where the modulation signal exists. The noise spectrum has an uniform level in the bandwidth of the bandpass filter 1 provided that the noise is white noise. Accordingly, the desired signal which has the correlation to the frequency is recognized from the noise component which has no correlation to the frequency, even in low C/N ratio.

The frequency estimation circuit 15 estimates the center frequency of the modulation signal by using the above principle. The estimation circuit 15 calculates the power sum $D_k(1 \leq k \leq N_1 - m + 1)$ in a predetermined bandwidth $B_0$ as follows.

$$D_k = \sum_{i=k}^{k+m-1} P_i \quad (10)$$

The $P_i$ $(1 \leq i \leq N_1)$ in the equation (10) is the power spectrum at each frequency provided by the adder 14. The value m is the number of samples in the bandwidth $B_0$, and the following relations are satisfied, where $\Delta\epsilon$ is discrete interval of frequency of spectrum.

$$B_0 = m \cdot \Delta\epsilon \quad (11)$$

Assuming that the discrete frequency value of the i'th spectrum is $W_i$, and the modulation signal exists with the highest probability between $W_i$ and $W_{N+1}$ and the power of $D_k$ $(1 \leq k \leq N_1 - m + 1)$, or the center frequency of the modulation signal is obtained as follows, where $k_{max}$ is the value k which makes $K_k$ the maximum, and $W_r$ is the center frequency of the modulation signal.

$$W_r = W_{kmax} + m \cdot \Delta\epsilon/2 \quad (12)$$

As described above, the center frequency $W_r$ of the modulation signal is obtained relatively correctly even though the circuit are conditions poor, by using FFT technique.

It should be noted that an FFT circuit may be replaced by a sliding DFT circuit which obtains frequency components in every sampling time.

Next, the frequency adjustment is carried out for $X_i$ and $Y_i$ which are outputs of the A/D converters 8 and 9 in the frequency adjust circuit 16, by using the estimated center frequency. The frequency adjustment is carried out as follows.

$$X_i' = X_i \cos(2\pi W_r t_i) + Y_i \sin(2\pi W_r t_i) \quad (13)$$

$$Y_i' = -X_i \sin(2\pi W_r t_i) + Y_i \cos(2\pi W_r t_i) \quad (14)$$

The $X_i'$ and $Y_i'$ have the center frequency $(\Delta\omega - 2\pi W_r)$ after the above process in the equations (13) and (14). When the $W_r$ is estimated correctly, the value $(\Delta\omega - 2\pi W_r)$ is small as compared with the signal bandwidth. The estimated center frequency is also applied to the PLL circuit 20 for updating the inner state of the PLL circuit 20. The output of the frequency adjust circuit 16 is applied to the clock regeneration circuit 19 through the lowpass filters 17 and 18. The clock regeneration circuit 19 takes the best clock time, and derives the data at said best clock time. The clock regeneration circuit itself is conventional, and any regeneration system may be used in the present invention. The output of the clock regeneration circuit 19 is applied to the PLL circuit 20, which follows the frequency change and the phase change, to provide the output signal with the compensated frequency and phase.

Figure 2:
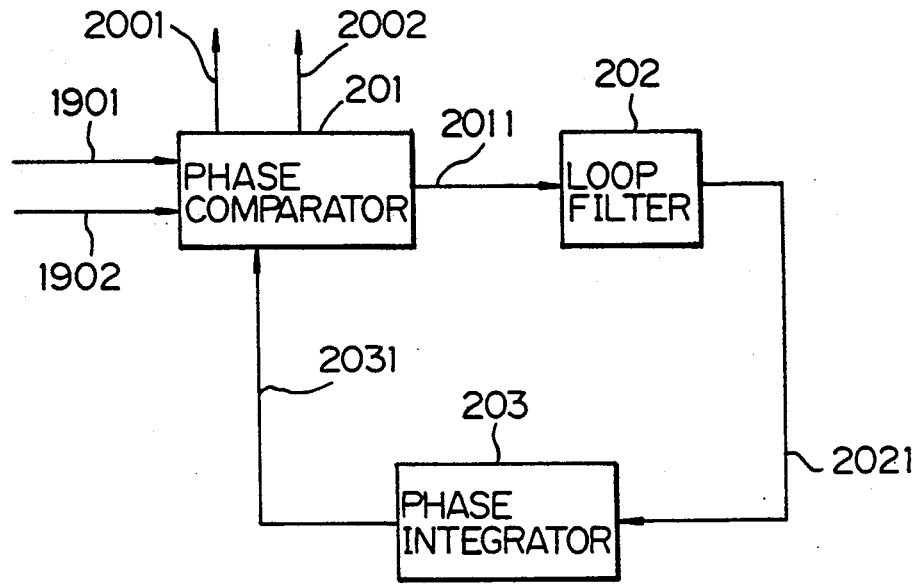
FIG. 2 is a block diagram of a PLL circuit 20 in FIG. 1.

FIG. 2 shows a block diagram of the PLL circuit 20. FIG. 2 is the embodiment of a Costas PLL circuit, which has a phase comparator 201, a loop filter 202, and a phase integrator 203. The phase comparator 201 receives the orthogonal input signals 1901 and 1902, and the output 2031 of the phase integrator 203, so that the phase comparison is carried out by the following equations to provide an output signal depending upon the phase difference:

$$C_m = C_{in,m}\cos\theta_m + S_{in,m}\sin\theta_m \quad (15)$$
$$S_m = S_{in,m}\cos\theta_m - C_{in,m}\sin\theta_m \quad (16)$$
$$V_{out} = \text{sign}(C_m) \cdot S_m \quad (17)$$

$C_{in,m}$, $S_{in,m}$ are signals on the lines 1901 and 1902, respectively, $\theta_m$ is a signal on an output line 2031 of the phase comparator 201, and $V_{out}$ is an output signal on an output line 2011, indicating a phase difference. Also, $C_m$ and $S_m$ are the coherent detected signals of an input signal, and are provided by the phase comparator 201 as the sensing signals 2001 and 2002. A phase comparator 201 itself is conventional.

Figure 3:
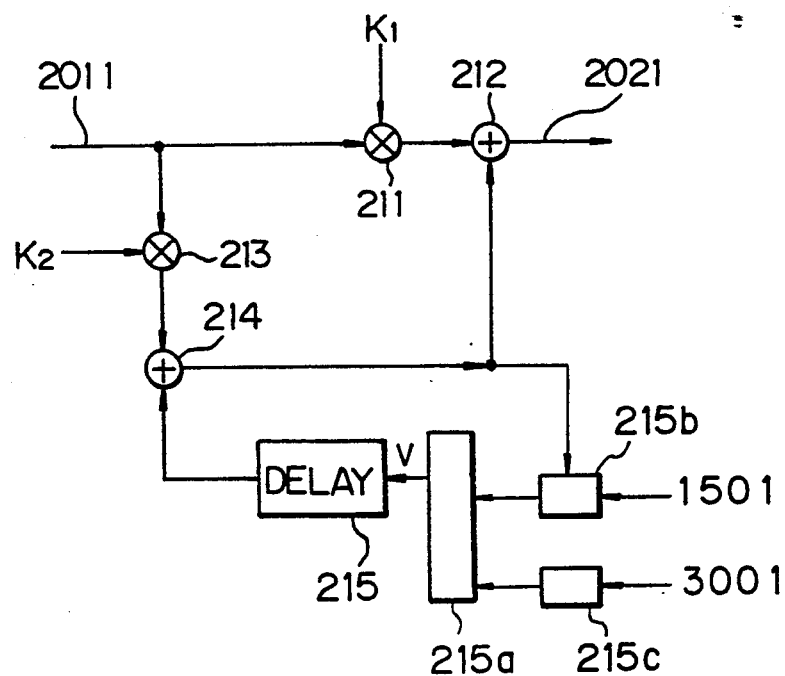
FIG. 3 shows a loop filter in a PLL.
Figure 10:
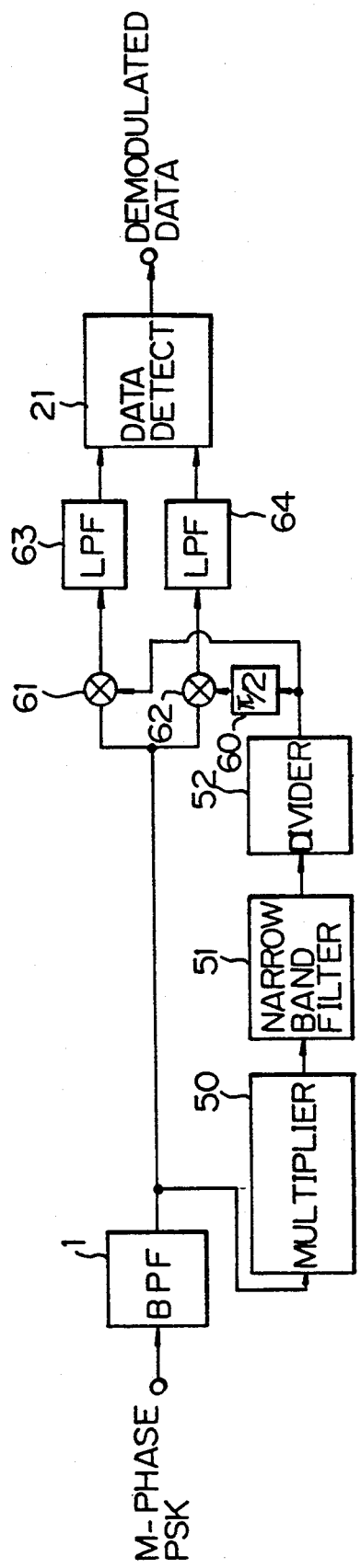
FIG. 10 is a prior PSK signal demodulation system using a frequency multiplier and a narrow band filter.
Figure 11:
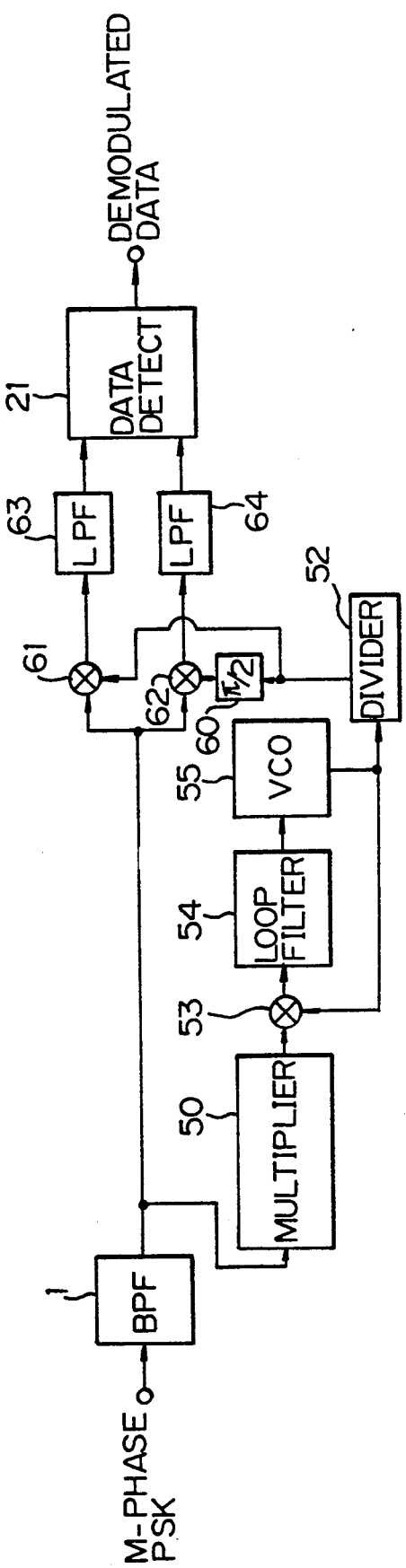
FIG. 11 is a prior art PSK signal demodulation system using a frequency multiplier and a PLL.

The output of the phase comparator 201 is applied to the loop filter 202. It is preferable that the loop filter is a complete integral type filter as shown in FIG. 3 so that the average phase error of the PLL circuit due to the frequency deviation of an input signal, is zero. In the present loop filter, the input phase error signal 2011 is separated to two branches, and one of them is applied to the adder 212 through the multiplier 211 which multiplicates the constant $k_1$. The other branch of the error signal 2011 is applied to the adder 214 through the multiplier 213 which multiplies the constant $k_2$. The output of the adder 214 is applied to the adder 212, and the delay circuit 215, which delays the input signal by one sampling time through a selector 215a. The output of the delay circuit 215 is applied to the adder 214. The delay circuit 215 and the adder 214 constitute a complete integrator.

The selector 215a also receives the output of the frequency estimation circuit 15 through the line 1501 and the calculator 215b which effects the calculation of the equation (19). In the case of the embodiment of FIG. 6, the selector 215a receives the output of the frequency estimation circuit 30 through the line 3001 and the calculator 215c which effects the calculation of the equation (27). Therefore, the selector 215a provides the output of the adder 214 to the delay circuit 215 when no output of the frequency estimation circuits 15 and 30 exists. When the output of the frequency estimation circuit 15 exists, the adder output is applied to the delay circuit 215 through the selector 215a. When the output of the selector 30 exists, the frequency estimation circuit output is applied to the delay circuit 215 through the calculator 215c and the selector 215a.

The output of the loop filter 202 is applied to the phase integrator 203, which integrates the input signal according to the following equation, and provides the phase signal:

$$\theta_m = \theta_{m-1} + \Delta\theta_m \qquad (18)$$

where $\theta_m$ and $\theta_m$ the an output phase and the input phase difference signal, respectively, for the m'th sample input signal.

The PLL circuit 20 operates for the signal which is sampled with the optimum clock so that the process operation amount is decreased.

The outputs 2001 and 2002 of the PLL circuit 20 are applied to the waveform shaping circuits 21 and 22 which reduce the noise component. The outputs 2001 and 2002 are then applied to the data detector 23, which effects the binary hard detection, or multi-level soft detection to provide a demodulated output signal.

FIG. 4 shows the time schedule of the operation of the present demodulation system. It is assumed that the portions between the bandpass filter 1 and the A/D converters 8 and 9 operate always. Assuming that the demodulation process starts at time $t_0$, an input digital signal is stored in the buffer memory 10 until the time $t_1$. The carrier frequency estimation is carried out between the time $t_1$ and the time $t_3$ by the FFT circuit 11, the square circuits 12 and 13, the adder 14, and the frequency estimation circuit 15. The frequency adjust operation is carried out from the time $t_3$ based upon the estimated frequency. At the same time, the lowpass filters 17 and 18, the clock regeneration circuit 19, the PLL circuit 20, the waveform shaping circuits 21 and 22, and the data detector 23 start the operation.

The carrier frequency estimation is carried out again at time $t_3$ for the digital signals between $t_2$ and $t_3$. When the frequency is estimated at time $t_5$, the estimated frequency is used from that time for the frequency adjustment. The adjusted frequency which is the output of the frequency adjust circuit 16 and the input of the PLL circuit 20 is discontinuous because of the update of the frequency estimation. Therefore, in order to solve that problem, the estimated frequency is also applied to the PLL circuit 20 through the line 1501 so that the inner state of the PLL circuit 20 is updated.

It is possible to follow the discontinuous frequency by updating an input V of the delay circuit 215 according to the following equation:

$$v = v_0 + 2\pi(f_e - f_{e0})/B \qquad (19)$$

where $v_0$ is the value which has been set in the delay circuit 215, $f_e$ is the updated frequency estimate, $f_{e0}$ is the previous frequency estimate, and B is the bandwidth of the modulation signal.

By repeating the above process, the operations shown in FIG. 4 are carried out either periodically or continuously. The PLL circuit 20 follows the carrier frequency and the phase continuously by using the discontinuous frequency estimate obtained in the FFT circuit 11.

As described above, according to the present invention, the frequency deviation of the received PSK signal is estimated by using the FFT circuit 11 which estimates the carrier frequency, and the PLL circuit 20 locks so that the residual frequency error and the phase error are removed. Thus, an excellent demodulation operation is assured even when the C/N is poor, when the frequency deviation is large, and when the short term frequency offset occurs. It should be appreciated that when the PLL circuit 20 locks the frequency and the phase, no further estimation of the frequency is necessary unless the frequency deviation exceeds a predetermined value. As a result, the number or the period of the frequency estimation may be decreased.

In the above embodiment, the frequency adjustment operation may be carried out in an analog form, instead of a digital form.

As a modification, an A/D converter may be inserted at the output of the bandpass filter 1 so that the quasi-coherent detection is carried out in a digital form.

The frequency adjust circuit 16 operates by using the frequency estimate based upon the past carrier frequency. If a delay circuit is inserted between an output of the A/D converters 8 and 9, and an input of the frequency adjust circuit 16, the frequency adjust circuit 16 may adjust the frequency by using the frequency estimate at present.

The PLL circuit 20 may use signals not only at the optimum clock time, but also another clock time. In the latter case, the data detection is effected at the signal at the optimum clock time. As a modification, the PLL circuit 20 may be located at the input side of the clock regeneration circuit 19, although FIG. 1 shows the PLL circuit 20 at the output side of the clock regeneration circuit 19.

Further, the estimated frequency may be tested by taking the statistical value of the past frequency estimates. When the estimated frequency seems to be in error, the updated frequency estimate is not used, but the old frequency estimate is used.

Further, the frequency estimate operation by the buffer memory 10, the FFT circuit 11, the square circuits 12 and 13, the adder 14, and the frequency estimate circuit 15 may be carried out only at the beginning of the process, or only during the beginning of the process and at the asynchronous state of carrier synchronization or clock synchronization.

The time schedule in that case is shown in FIG. 5. In FIG. 5, the process starts at time $t_0$, and, the digital data is stored in the buffer memory 10 between $t_0$ and $t_1$. The frequency estimate operation is carried out between $t_1$ and $t_3$. By using the frequency estimate obtained at time $t_3$, the frequency adjustment operation is carried out. Simultaneously, the lowpass filters 17 and 18, the clock regeneration circuit 19, the PLL circuit 20, the waveform shaping circuits 21 and 22, and the data detection circuit 23 start the operation.

If the asynchronous state of the carrier synchronization or the clock synchronization is detected at time $t_10$, the process is initiated at time $t_{10}$, and the same operation as that of the start of the process is carried out.

The process amount may be decreased by carrying out the frequency estimate operation only when the carrier frequency synchronization or the clock synchronization is in an asynchronous state.

The operation of the frequency adjustment circuit 16, the lowpass filters 17 and 18, the clock regeneration circuit 19, the PLL circuit 20, the waveform shaping circuits 21 and 22, and the data detector 23 may stop until the new estimated frequency is obtained during an asynchronous state.

Further, the accuracy of the frequency estimate may be increased by carrying out the frequency estimate operation a plurality of times so that the resultant frequency estimate is determined by using the outputs of the plurality of measures.

EMBODIMENT 2

FIG. 6 shows a block diagram of the second embodiment of the PSK demodulation system according to the present invention. In FIG. 6, the numerals 1 through 23 show the same members as those in FIG. 1. The PLL circuit shown in FIGS. 2 and 3 may be used as the PLL circuit in FIG. 6. In FIG. 6, the numeral 24 is a frequency multiplier, 25 is a buffer memory, 26 is a FFT (fast Fourier transform) circuit, 27 and 28 are a square circuit, 29 is an adder, and 30 is a frequency estimation circuit. As mentioned before in the explanation of FIG. 1, an FFT is replaced by a sliding DFT circuit.

The outputs of the low pass filters 17 and 18 are shown as follows:

$$X_i'' = \sqrt{2} \cdot A \cos(\Delta\omega' t_i + \theta_k + \theta_2) + n_c''(t) \quad (20)$$

$$Y_i'' = \sqrt{2} \cdot A \sin(\Delta\omega' t_i + \theta_k + \theta_2) + N_s''(t) \quad (21)$$

where $\Delta\omega' = \Delta\omega - 2\pi W_r$ (22)

The $\theta_2$ is the initial phase which depends on the initial phase $\theta_1$ of the $X_i$ and $Y_i$ and the characteristics of the low pass filters 17, 18. The $X_i''$ and $Y_i''$ are applied to the multiplier 24, which multiplies the frequency of $X_i''$ and $Y_i''$ by M times in case of M phase PSK signal and outputs the following signals:

$$X_i''' = A' \cos(M\Delta\omega' t_i + M\theta_2) + n_c'''(t) \quad (23)$$

$$Y_i''' = A' \sin(M\Delta\omega' t_i + M\theta_2) + n_s'''(t) \quad (24)$$

The modulation phase component $\theta_k$ in the equations (20) and (21) are removed in the equations (23) and (24) by the M times multiplier. The $n_s'''(t)$ and $n_c'''(t)$ show noise components which are generated by the multiplier operation of a noise component and/or a signal component. The $X'''$ and $Y'''$ are stored in the buffer memory 25. When $N_2$ sets of data $X_i'''$ and $Y_i'''$ are stored in the buffer memory 25, those $N_2$ sets of data are forwarded to the FFT circuit 26, which converts the time domain signal to the frequency domain signal through the complex FFT operation, and provides the real part and the imaginary part of the amplitude spectrum 2601 and 2602 to the square circuits 27 and 28. The power spectrum of $N_2$ points are calculated by the square circuits 27 and 28, and the adder 29, and are applied to the frequency estimation circuit 30. As the non-modulated signal power in the equations (23) and (24) exists at only the frequency $M\omega'$, it is possible to discriminate the signal component and the noise component by monitoring the power spectrum even in a low received C/N ratio. The frequency estimation circuit 30 provides the frequency $W_e$ which has the maximum power in the power spectrum, and applies the value $W_e/M$ to the PLL circuit 20 as the estimated residual frequency error 3001.

When an input signal to the PLL circuit 20 has frequency error, the inner state of the loop filter or the input v of the delay circuit 215 for the frequency error f is close to the following value after the PLL circuit 20 is locked.

$$v = 2\pi\Delta f/B \quad (25)$$

As the frequency lock is obtained when the value v becomes close to the value in the steady state, it takes long time for a frequency lock when the value f is large. According to the present embodiment, the frequency lock is carried out quickly by calculating the value v at the steady state by using the estimated residual frequency error, and sets the input signal of the delay circuit 215 close to said value v.

FIG. 7 shows a time schedule of the demodulation process in FIG. 6. Assuming that the process starts at the time $t_0$, and stores the digital signal in the buffer memory 10 during the time $t_0$ and $t_1$, the frequency estimation operation is carried out by the FFT circuit 11, the square circuits 12 and 13, the adder 14, and the frequency estimation circuit 15 by using the signals stored in the buffer memory 10. The frequency estimation operation is carried out during the time $t_1$ and $t_3$. By using the estimated frequency, the operation of the frequency adjust circuit 16 starts at time $t_3$. Simultaneously, the low pass filters 17 and 18, the clock regeneration circuit 19 start the operation.

At time $t_3$, the frequency estimation operation starts again by using the digital signals stored in the buffer memory 10 during time $t_2$ and $t_3$. When the estimated frequency is obtained at time $t_6$, the estimated frequency thus obtained is used for the frequency adjustment. The frequency adjusted digital signal during $t_3$ and $t_4$ is multiplied, and is stored in the buffer memory 25. By using the digital signal stored in the buffer memory 25, the residual frequency error is estimated during $t_4$ and $t_7$ by the FFT circuit 26, the square circuits 27 and 28, the adder 29, and the frequency estimate circuit 30. By using the estimated frequency, the PLL circuit 20 begins the operation at time $t_7$, and simultaneously, the data detection operation is carried out. The above operation is repeated.

As the frequency estimate for the frequency adjustment at the beginning of the residual frequency error estimate operation differs from that at the end of the residual frequency error estimate operation, the residual frequency estimate $df_e$ is updated as follows by using the frequency estimate $f_{e0}$ which is used for the frequency adjustment, and the frequency estimate $f_{e1}$ for the frequency adjustment applied to the PLL circuit 20 at time $t_7$:

$$df_e' = df_e + f_{e0} - f_{e1} \qquad (26)$$

The inner state of the PLL circuit 20, or the input value $v$ of the delay circuit 215 is set as follows by using the updated residual frequency error estimate $df_e'$:

$$v = 2\pi \cdot df_e'/B \qquad (27)$$

The inner state of the PLL circuit 20 is updated every time the carrier frequency or the residual frequency error is estimated.

For instance, when the frequency estimate is obtained at time $t_9$, the inner state of the PLL circuit 20 is updated according to the equation (19) so that the discontinuity of the frequency adjustment is compensated. Further, when the residual frequency error estimate is obtained at time $t_{10}$, the inner state of the PLL circuit 20 is updated:

$$v = v_0 + 2\pi(df_e' - df_{e0}')/B \qquad (28)$$

By repeating the above operation, each process shown in FIG. 7 is carried out either periodically or continuously.

The second embodiment has the feature that the frequency lock and the phase lock in the PLL circuit 20 are carried out quickly by setting the inner state of the PLL circuit 20 with the estimated residual frequency error obtained through the frequency adjustment, and the FFT process of the multiplied frequency of the adjusted frequency.

As for the frequency estimate, it is possible to test the estimated frequency by using the statistical technique. When the updated estimation seems to be in error, the previous estimation is used, instead of the updated estimation.

It should be noted that the set of the inner state of the PLL circuit 20 with the estimated residual frequency error is the same as the compensation of the residual frequency error by a frequency adjuster installed at the input of the PLL circuit 20.

FIG. 8 shows another time schedule of the second embodiment, in which the process of the storage of the digital signal in the buffer memory 10 and the frequency estimation process by the FFT circuit 11, the square circuits 12 and 13, the adder 14, and the frequency estimate circuit 15 are carried out only at the beginning of the operation, or at the beginning of the operation and during the asynchronous state.

In FIG. 8, it is assumed that the operation begins at time $t_0$, and the digital data until time $t_1$ is stored in the buffer memory 10. The frequency estimation is carried out during time $t_1$ and time $t_2$, and the frequency adjustment operation begins at time $t_2$ with the obtained frequency estimate. Simultaneously, the operation of the low pass filters 17 and 18, and the clock regeneration circuit 19 start. The frequency adjusted digital data between time $t_2$ and $t_3$ are multiplied and stored in the buffer memory 25. The estimation of the residual frequency error for the stored data is carried out between time $t_3$ and $t_5$ by the FFT circuit 26, the square circuits 27 and 28, the adder 29, and the frequency estimation circuit 30. With the obtained frequency estimate, the PLL circuit 20 begins the operation at time $t_5$, and the data detection operation begins. The inner state of the PLL circuit 20, or the input of the delay circuit 215 is set as follows by using the residual frequency error estimate $df_e$ $$v = 2\pi \cdot df_e/B \qquad (29)$$

After that, each of the operations of (a) the frequency adjustment circuit 16, (b) the low pass filters 17 and 18, and the clock regeneration circuit 19, (c) the storage of the digital signal in the buffer memory 25, and the estimate of the residual frequency error, (d) the PLL circuit 20, and the waveform shaping circuits 21 and 22, and (e) the data detection circuit 23, are carried out periodically, or continuously.

It is assumed that the asynchronous state of the carrier frequency or the clock signal is detected at time $t_{10}$. Then, the same operation as that of the initial operation is carried out at time $t_{10}$.

It should be appreciated that the number of operations in the process is considerably reduced by carrying out the frequency estimate operation only at the initial stage and at the asynchronous state.

In case of the asynchronous state, the operation of the frequency adjustment circuit 16, the low pass filters 17 and 18, the clock regeneration circuit 19, the residual frequency error estimation, the PLL circuit 20, the waveform shaping circuits 21 and 22, and the data detection circuit 23 may stop until the frequency estimation operation finishes.

In order to improve the accuracy of the frequency estimate, a plurality of frequency estimate operations may be carried out so that the final estimate is determined according to the result of said plural estimates.

FIG. 9 shows still another time schedule of the second embodiment, in which the frequency estimate operation is carried out asynchronously relative to the residual frequency error estimate process.

The process begins at time $t_0$ and the digital signal between time $t_0$ and $t_1$ is stored in the buffer memory 10. The frequency estimate process is carried out between the time $t_1$ and $t_2$ by the FFT circuit 11, the square circuits 12 and 13, the adder 14, the frequency estimate circuit 15. The frequency adjust process starts at time $t_3$ with the estimated frequency. Simultaneously, the process by the low pass filters 17 and 18, the clock regeneration circuit 19 starts. At time $t_3$, the frequency estimate process is carried out again by using the data stored in the buffer memory 10 between the time $t_2$ and $t_3$. When the frequency estimate is obtained at time $t_6$, the updated estimate is used for the frequency adjustment. Between the time $t_3$ and $t_4$, the frequency adjusted digital data are multiplied, and stored in the buffer memory 25. The residual frequency error estimate process is carried out for the stored data between the time $t_4$ and $t_8$ by the FFT circuit 26, the square circuits 27 and 28, the adder 29 and the frequency estimate circuit 30. The process of the PLL circuit 20 starts at time $t_8$ with the obtained estimate, and the operation of the waveform shaping filters 21 and 22, and the data detector 23 begin. As the frequency estimate for the frequency adjustment process at the beginning of the residual frequency error estimate differs from that at the end of the residual frequency error estimate, the residual frequency error estimate $df_e$ is corrected according to the equation (26)

by using the frequency estimate $f_{e0}$ which is used for the frequency adjustment for the residual frequency error estimate, and using the frequency estimate $f_{e1}$ which is used for the frequency adjustment for the input to the PLL circuit 20 at the time $t_8$. The inner state of the PLL circuit 20, or the input signal v of the delay circuit 215 is set according to the equation (27) by using the corrected residual frequency error estimate $df_e'$. Thus, the inner state of the PLL circuit 20 is updated every time the frequency estimate or the residual frequency error estimate is updated.

Each process in FIG. 9 is carried out by repeating the above operations periodically or continuously.

As the frequency estimate process is asynchronous with the residual frequency error estimate process, the interval of the frequency estimate process may be independent upon the interval of the residual frequency error estimate process. Therefore, the requested characteristics are satisfied with the optimum operations.

As mentioned above in detail, the present invention estimates first the frequency deviation of receive PSK signal based upon the frequency estimate by using the FFT technique, and follows the residual frequency error and the residual phase error by using the PLL circuit. Therefore, the excellent and continuous demodulation is possible in low C/N, large frequency deviations in the received signal, and large frequency offsets in a short time period.

The process amount may be decreased by restricting the frequency estimate process to the initial stage of the operation and to the asynchronous state of the carrier frequency and/or the clock frequency.

Further, after the frequency is adjusted by using the estimated frequency, the residual frequency error is estimated with a high degree of accuracy by using the multiplication of the adjusted frequency and the FFT process. Setting of the inner state of the PLL circuit with the estimated residual frequency error provides the quick frequency lock and the quick phase lock. The process amount is also reduced by restricting the frequency estimate process only to the initial stage and the asynchronous state.

Further, the asynchronous operation of the frequency estimate and the residual frequency error estimate allows the interval of the frequency estimate operation free from the interval of the residual frequency error estimate operation.

From the foregoing, it will now be apparent that a new and improved demodulation system has been found. It should be understood, of course, that the embodiments disclosed ar merely illustrative and are not intended to limit the scope of the invention. Reference should be made to the appended claims, therefore, rather than the specification as indicating the scope of the invention.

What is claimed is:

1. A PSK signal demodulation system comprising:
an input terminal for accepting a received PSK signal;
a bandpass filer having a bandwidth wider than the bandwidth of the received PSK signal, and coupled with said input terminal for passing the received PSK signal;
a local frequency generation means having a fixed frequency generator and a phase shifter, for providing a local frequency with a predetermined phase relation with an output of the fixed frequency generator;
a coherent detection means coupled with said bandpass filter for coherent detection of the received PSK signal using the local frequency;
an analog/digital converter for converting a coherent detected signal with a predetermined sampling interval;
a first storage means for storing temporarily a output of said analog/digital converter;
a first fast Fourier transform (FFT) conversion means for converting the time domain signal stored in said first storage means to a frequency domain signal;
a first power spectrum means for providing a power spectrum of the frequency domain signal coupled with an output of said first FFT conversion means;
a first frequency estimation means for estimating a carrier frequency of the received PSK signal using the power spectrum;
a frequency adjustment means coupled with an output of said analog/digital converter and an output of said first frequency estimation means for frequency adjustment of a received carrier signal;
a low pass filter coupled with output of said frequency adjustment means for decreasing a noise component imposed on the received PSK signal;
a PLL circuit coupled with an output of said first frequency estimation means which updates at least one of an initial value of an integrator in a loop filter of said PLL circuit and an offset of an input of a phase integrator of said PLL circuit, said PLL circuit being coupled with an output of said low pass filter through said clock generation circuit for correcting a frequency and phase of an output of a clock regeneration means;
a symbol decision means coupled with said PLL circuit for determining each symbol of the received PSK signal; and
an output terminal coupled with an output of said symbol decision means for providing a demodulated output signal.

2. A PSK signal demodulation system according to claim 1, wherein said FFT means, said power spectrum means, and said frequency estimation means operate only at an initial stage of demodulation operation, and an asynchronous state of the carrier frequency or a clock synchronization.

3. A PSK signal demodulation system according to claim 1, further comprising:
a second storage means for storing temporarily the output of said low pass filter;
a second fast Fourier transform (FFT) conversion means for converting a time domain signal stored in said second storage means to a frequency domain signal;
a second power spectrum means for providing a power spectrum of the frequency domain signal;
a second frequency estimation means for estimating a center frequency of the output of said second power spectrum means, and an output of said second frequency estimation means being applied to said PLL circuit for updating said PLL circuit.

4. A PSK signal demodulation system according to claim 3, wherein said second FFT conversion means, said second power spectrum means, and said second frequency estimation means operate only at initial stage of the demodulation operation, and the asynchronous state of the carrier frequency or a clock synchronization.

5. A PSK signal demodulation system according to claim 3, wherein a first frequency estimation by using said first frequency estimation circuit operates asynchronous to a second frequency estimation using said second frequency estimation means.

6. A PSK signal demodulation system according to claim 1, wherein:

said PLL circuit is a Costas PLL circuit having a phase comparator, a loop filter coupled with an output of the phase comparator, and a phase integrator coupled with an output of the loop filter for applying the output to the phase comparator, the loop filter being a complete integration filter and having an adder connected between an input and the output of the loop filter, a delay circuit, an adder for providing a sum of an input and an output of the delay circuit to the adder and the delay circuit.

7. A PSK signal demodulation system according to claim 6, wherein the input of the delay circuit is switched to an output of said frequency estimation means when said frequency estimation means has an output.

8. A PSK signal demodulation system according to claim 1, wherein a clock regeneration means is coupled between an output of said low pass filter and an output of said PLL circuit for regenerating a clock signal.

9. A PSK signal demodulation system according to claim 3, wherein a frequency multiplier for multiplying the frequency of an M-phase PSK signal by M times is provided between said low pass filter and an input of said second storage means.

10. A method for demodulation of a PSK signal comprising the steps of:

coherent detecting a received PSK signal which is phase modulated with a local frequency close to a carrier frequency of the received PSK signal;

estimating a carrier frequency of the received PSK signal based upon a power spectrum of the received PSK signal obtained through first fast Fourier transform (FFT) conversion from a time domain signal to a frequency domain signal;

adjusting a frequency of the received PSK signal by using the estimated carrier frequency, and updating a PLL circuit by using said estimated carrier frequency;

regenerating a clock signal of the received PSK signal after processing the adjusted frequency with a low pass filter having a center frequency equal to the adjusted frequency for reducing noise; and demodulating the received PSK signal with said PLL circuit which follows a frequency and a phase of the frequency-adjusted received PSK signal.

11. A method for demodulation of a PSK signal according to claim 10, wherein said estimating carrier frequency through FFT conversion is carried out at initial stage of a demodulation operation, at an asynchronous state of the carrier frequency, and at an asynchronous state of a clock signal.

12. A method for demodulation of a PSK signal according to claim 10, further comprising the steps of:

obtaining a non-modulated signal of the frequency-adjusted received PSK signal by multiplying the frequency adjusted received PSK signal;

obtaining a power spectrum of the non-modulated signal through second FFT conversion from a time domain signal to a frequency domain signal of the non-modulated signal, estimating a residual frequency error of the non-modulated signal by using the power spectrum; and updating said PLL circuit.

13. A method for demodulation of a PSK signal according to claim 12, wherein the first FFT conversion operates asynchronously with the second FFT conversion.

* * * * *